US012456142B2

United States Patent
Yu

(10) Patent No.: US 12,456,142 B2
(45) Date of Patent: Oct. 28, 2025

(54) "LIVE-STREAMING" WAREHOUSE MANAGEMENT SYSTEM BASED ON ULTRA-HIGH FREQUENCY (UHF) RFID TECHNOLOGY

(71) Applicant: WUXI HYESOFT SOFTWARE TECHNOLOGY CO., LTD., Jiangsu (CN)

(72) Inventor: Liqun Yu, Jiangsu (CN)

(73) Assignee: WUXI HYESOFT SOFTWARE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/017,309

(22) Filed: Jan. 10, 2025

(65) Prior Publication Data

US 2025/0148526 A1 May 8, 2025

Related U.S. Application Data

(63) Continuation of application No. PCT/CN2024/082674, filed on Mar. 20, 2024.

(30) Foreign Application Priority Data

Apr. 4, 2023 (CN) .......................... 202310365582.2

(51) Int. Cl.
*G06Q 30/00* (2023.01)
*G06K 7/10* (2006.01)
(Continued)

(52) U.S. Cl.
CPC ..... *G06Q 30/0635* (2013.01); *G06K 7/10306* (2013.01); *G06K 7/1413* (2013.01)

(58) Field of Classification Search
CPC ........... G06Q 30/0635; G06K 7/10306; G06K 7/1413
See application file for complete search history.

(56) References Cited

U.S. PATENT DOCUMENTS 11,339,000 B1 * 5/2022 Minsky ................ G06K 7/1413
2015/0307278 A1 * 10/2015 Wickham ............ G06Q 10/087
700/216
(Continued)

FOREIGN PATENT DOCUMENTS

CN 104933381 A 9/2015
CN 108446868 A 8/2018
(Continued)

OTHER PUBLICATIONS

Qian Wang, R. McIntosh and A. Mileham, "A RFID-based automated warehouse design," 2010 2nd International Conference on Computer Engineering and Technology, Chengdu, 2010, pp. V6-359-V6-363, doi: 10.1109/ICCET.2010.5486197 (Year: 2010).*

Primary Examiner — Arielle E Weiner
(74) Attorney, Agent, or Firm — Rondaus PLLC; George Liu

(57) ABSTRACT

Disclosed is a "live streaming" warehouse management system based on Ultra-High Frequency (UHF) RFID technology, which belongs to the technical field of warehouse management. The system comprises a data processing center, an RFID-based automated sorting vehicle, an RFID gateway and an automatic sorting line; wherein the RFID-based automated sorting vehicle is equipped with a picking processor, the RFID gateway is equipped with a first verification processor, the automatic sorting line is further equipped with a DWS device, and the DWS device is equipped with a second verification processor. The data processing center merges various orders to generate an order fulfillment task based on a preset multi-dimensional order merging strategy. The RFID-based automated sorting vehicle completes the entire process of order fulfillment, packing, and sealing for a plurality of orders simultaneously based on the order fulfillment plan, which saves space (Continued)

required for subsequent processes and improves order fulfillment efficiency.

6 Claims, 4 Drawing Sheets

(51) Int. Cl.
 *G06K 7/14* (2006.01)
 *G06Q 30/0601* (2023.01)

(56) References Cited

U.S. PATENT DOCUMENTS

| | | | |
|---|---|---|---|
| 2020/0160011 A1* | 5/2020 | Wagner | B65G 47/12 |
| 2021/0004760 A1 | 1/2021 | Durkee et al. | |
| 2022/0044192 A1* | 2/2022 | Bielecki | G06Q 10/087 |
| 2023/0028034 A1* | 1/2023 | Gravelle | B65G 1/0485 |
| 2023/0107899 A1* | 4/2023 | Tian | B65B 5/06 |
| | | | 705/28 |
| 2023/0206170 A1* | 6/2023 | Neumann | G06Q 10/08355 |
| | | | 705/338 |

FOREIGN PATENT DOCUMENTS

| | | |
|---|---|---|
| CN | 109160163 A | 1/2019 |
| CN | 109409454 A | 3/2019 |
| CN | 109615293 A | 4/2019 |
| CN | 209417770 U | 9/2019 |
| CN | 112149925 A | 12/2020 |
| CN | 115215035 A | 10/2022 |
| DE | 102010016124 A1 | 10/2010 |
| WO | 2013007114 A1 | 1/2013 |

* cited by examiner

"LIVE-STREAMING" WAREHOUSE MANAGEMENT SYSTEM BASED ON ULTRA-HIGH FREQUENCY (UHF) RFID TECHNOLOGY

CROSS-REFERENCE TO RELATED APPLICATIONS

This application is a continuation of International Application No. PCT/CN2024/082674, filed on Mar. 20, 2024, which claims priority to Chinese Patent Application No. 202310365582.2, filed on Apr. 4, 2023. All of the aforementioned applications are incorporated herein by reference in their entireties.

TECHNICAL FIELD

The present disclosure relates to a "live streaming" warehouse management system based on Ultra-High Frequency (UHF) RFID technology, and belongs to the technical field of warehouse management.

BACKGROUND

In the field of warehouse management technology, there are two basic modes of warehouse picking operations: the "pick-to-order" picking mode and the "batch picking" (also known as "pick-and-sort") picking mode. The "pick-to-order" picking mode involves picking items for each individual order. Picking personnel or picking equipment traverse various storage locations to retrieve and package the items listed on the order, resembling the action of picking fruit, hence the name "pick-to-order". On the other hand, the "batch picking" or "pick-and-sort" mode, also referred to as "pick-then-sort", involves aggregating a plurality of orders into a batch, first summarizing and picking the quantities of each item required across all orders (resembling picking fruit), and then distributing and packaging these items for each order individually, resembling sowing seeds, thus the name "pick-then-sort" picking mode.

Among these two modes, the "batch picking" mode allows for simultaneous picking and sorting of a plurality of, even dozens or hundreds of orders, making it significantly more efficient than the "pick-to-order" mode and thus widely used. However, it also has its drawbacks: 1) It requires a high level of proficiency from picking personnel and is highly dependent on manual labor; 2) The picking path is long, involving an initial picking stage followed by a sorting stage; 3) It demands a relatively large operating area, particularly for the sorting of a plurality of orders by item after the initial picking, which requires additional space; 4) The business process is lengthy with multiple handling steps, including picking, sorting, verification, packing, and printing of box codes. Each step requires a different space and must be executed in strict sequence; one step must be completed before the next can begin. If any step goes wrong, subsequent steps must halt.

For the above-mentioned problems, considering the practical application, where picking jobs are relatively low-skilled and picking personnel have high turnover, picking personnel often lack the necessary proficiency. For warehouses with a wide variety of items, on the one hand, it takes time for picking personnel to become familiar with the storage locations of items; on the other hand, the high turnover of picking staff hinders the development of their proficiency, leading to a contradiction that results in a higher error rate during picking. Furthermore, the long picking paths and large operating areas incur higher costs for businesses and result in lower space utilization efficiency. Most importantly, there is still considerable room for improvement in picking efficiency.

SUMMARY

In order to solve the existing problems, the present disclosure provides a "live-streaming" warehouse management system based on Ultra-High Frequency (UHF) RFID technology, wherein the system comprises a data processing center, an RFID-based automated sorting vehicle, an RFID gateway and an automatic sorting line; wherein the RFID-based automated sorting vehicle is equipped with a picking processor, the RFID gateway is equipped with a first verification processor, the RFID gateway is arranged at a cargo box input port of the automatic sorting line, and the automatic sorting line is further equipped with a DWS (Dimension, Weight, Scanning) device, and the DWS device is equipped with a second verification processor and positioned before each sorting outlet of the automatic sorting line;

The picking processor is connected to the data processing center by means of a wireless network, the first verification processor and the second verification processor are connected to the data processing center by means of a wireless network or a wired network, and uploading and downloading of data are realized by means of a network, so that the data processing center completes processing and tracking of corresponding orders according to information fed back by the picking processor, the first verification processor and the second verification processor;

The picking processor completes a first verification of each order during a picking process, the first verification processor completes a second verification of each order, and the second verification processor completes a third verification of each order.

Optionally, the RFID-based automated sorting vehicle is further equipped with an RFID reader and a corresponding RFID scanning area and a printer; the RFID reader is used to read a RFID tag information of items placed within the RFID scanning area; wherein the RFID reader and the printer are connected to the picking processor via a wireless network or a data transmission line; and the RFID-based automated sorting vehicle is equipped with S cargo box placement positions;

The data processing center merges every N orders into an order fulfillment task and a corresponding order fulfillment plan based on a preset multi-dimensional order merging strategy; the picking processor retrieves the order fulfillment task from the data processing center and generates corresponding order fulfillment instructions based on the order fulfillment plan, allowing picking personnel to complete the order fulfillment task according to order fulfillment instructions; and the order fulfillment plan includes specifications and quantities of cargo boxes required for each order in the order fulfillment task, and corresponding order fulfillment path;

During an order fulfillment process, the picking processor simultaneously performs order fulfillment and the first verification for N orders using components of the RFID-based automated sorting vehicle, and then completes a packing process, where the packaging process includes sealing box, printing box code and affixing box code to the box; wherein, $S \geq N$.

Optionally, the multi-dimensional order merging strategy comprises the following dimensions: order arrival time, order destination, items within the order, overlap of picking locations for the items within the order, order size and weather and road conditions at the order destination; and the specific order merging process is determined by the combination and sequence of these dimensions.

Optionally, the picking processor is further equipped with an interactive display screen and a voice interaction system, allowing picking personnel to interact with the picking processor through the interactive display screen and the voice interaction system.

Optionally, the system further comprises a replenishment processor, and the replenishment processor is connected to the data processing center via a wired or wireless network.

Optionally, each cargo box placement position on the RFID-based automated sorting vehicle is further equipped with an indicator, and the indicator is electrically connected to the picking processor to assist with the order fulfillment instructions by indicating the corresponding cargo box placement location to picking personnel.

Optionally, the RFID gateway is further equipped with a box code scanning device and an RFID reader-writer, the box code scanning device and the RFID reader-writer are connected to the first verification processor via the wireless network or the wired network; the box code scanning device is used to read a box code information when a cargo box passes through the RFID gateway and retrieve the items information inside the cargo box based on the box code information; the RFID reader-writer is used to directly read the RFID tags of the items inside the cargo box when the cargo box passes through the RFID gateway to obtain the corresponding items information; the first verification processor compares the items information inside the cargo box obtained through the box code scanning device with the items information inside the cargo box read by the RFID reader-writer to complete the second verification of the order.

Optionally, the DWS device is used to measure a weight and/or volume of the cargo box and scan the box code information before the cargo box reaches the corresponding sorting outlet; the second verification processor calculates a theoretical weight and/or volume of the corresponding cargo box based on the box code information and compares the theoretical weight and/or volume of the corresponding cargo box with the measured weight and/or volume of the cargo box to complete the third verification of the order.

Optionally, the sorting outlets of the automatic sorting line are arranged based on delivery addresses of all orders in an order pool; and a position sequence of the sorting outlets of the automatic sorting line is arranged based on a total number of all orders passing through each sorting outlet in the order pool.

Optionally, the RFID-based automated sorting vehicle is equipped with a driving device and a robotic arm device, and all tasks performed by picking personnel are completed through the cooperation of the driving device and the robotic arm device.

The beneficial effects of the present disclosure are:

The present disclosure provides a "live streaming" warehousing management system based on Ultra-High Frequency (UHF) RFID technology. Before order fulfillment, it adopts a multi-dimensional order merging strategy to merge various orders into an order fulfillment task containing a plurality of orders, thereby enhancing the picking efficiency of subsequent picking personnel. During order fulfillment process, an RFID-based automated sorting vehicle equipped with a picking processor, an RFID reader, a printer, an indicator, an interactive display screen, and a headphone is utilized. Upon receiving the order fulfillment task, the picking processor generates corresponding order fulfillment instructions, guiding the picking personnel to perform the necessary operations. The accuracy of order fulfillment is ensured through multiple means, including the indicator, the interactive display screen and the headphone, eliminating the dependence on the picking personnel's experience and proficiency. Additionally, the vehicle-mounted printer can print labels at any time for the picking personnel to use when sealing boxes, saving the need for a separate packing process and ensuring continuity in the order fulfillment, packing, and boxing process, thereby minimizing errors in intermediate steps. Furthermore, the picking processor is responsible for closed-loop confirmation of all instructions during the order fulfillment process, achieving the first verification. The first verification processor conducts a second verification of the cargo boxes before the cargo boxes enter the automatic sorting line. A second verification processor completes the third verification for each order before the cargo boxes leave the automatic sorting line and enter the respective sorting outlets. This three-time verification process ensures a 100% accuracy rate for shipments. Moreover, the system of the present disclosure only requires space for setting up the warehouse and the automatic sorting line. Compared to existing warehousing management systems based on the "pick-and-pack" model, it saves space needed for sorting, packing, and verification areas, significantly reducing enterprise warehousing costs and improving space utilization efficiency.

BRIEF DESCRIPTION OF THE DRAWINGS

In order to more clearly illustrate the technical solutions in the embodiments of the present disclosure, the drawings needed to be used in the description of the embodiments will be briefly introduced below. Obviously, the drawings in the following description are only some embodiments of the present disclosure, and for a person of ordinary skill in the art, other drawings can also be obtained based on these drawings without exerting creative efforts.

DETAILED DESCRIPTION OF THE EMBODIMENTS

Figure 1:
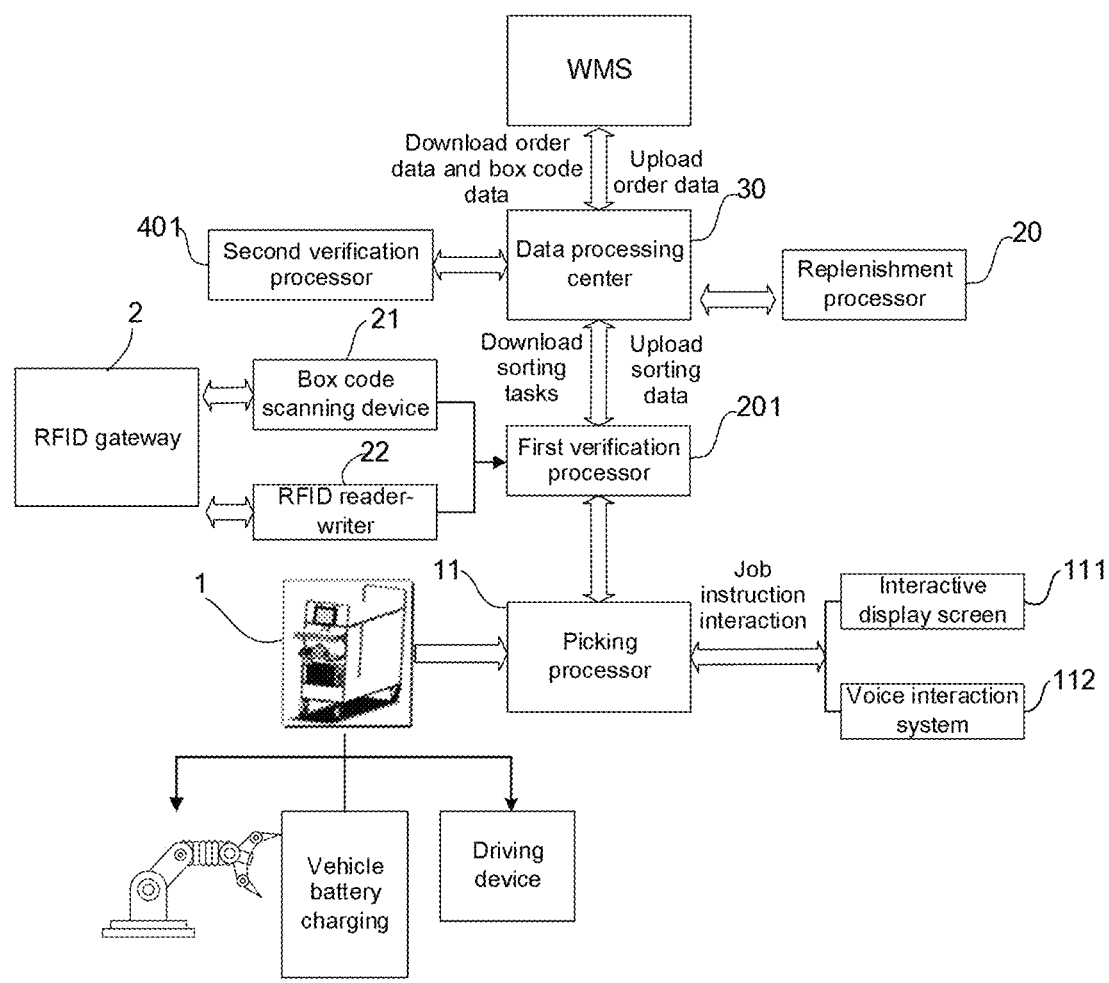
FIG. 1 is a schematic diagram of data transmission between various components in the "live-streaming" warehouse management system based on UHF RFID technology provided by the present disclosure.

It is well-known that items are typically stored in different zones based on their categories. In the apparel industry, for instance, items are often classified into three levels: major categories, middle categories, and sub-categories. The major categories include children's wear, women's wear, and men's wear. Middle categories represent further subdivisions within each major category; for example, women's wear can be subdivided into shirts, T-shirts, dresses, and so on. Sub-categories, on the other hand, are even more specific subdivisions within middle categories, such as dresses and skirts under the women's wear-dresses category.

According to the classification in the apparel industry, apparel storage warehouses can be divided into multiple zones, each storing all items of a major or middle category. Within each zone, further shelves are set up based on the subdivisions of middle and sub-categories. Moreover, items are further subdivided into SKUs (Stock Keeping Units) and stored on corresponding shelves.

The basic modules of existing Warehouse Management Systems (WMS) include procurement management, warehouse management, sales management, report generation, and inquiry functions. Warehousing centers can select corresponding functional modules based on their actual needs ("warehousing" in the present disclosure refers to storage warehouses and distribution centers). Typically, warehousing centers receive orders from headquarters or various stores and then complete the order fulfillment and shipment processes. However, existing WMS rely on either the "pick-to-order" picking mode or "batch picking" picking mode when fulfilling and shipping orders, leading to issues such as inefficiency, long picking paths, and the need for large operational spaces. Therefore, the present disclosure provides a "live-streaming" warehouse management system based on UHF RFID technology. This system optimizes the entire process from order processing to order fulfillment, re-checking, packaging, and shipment, reducing dependence on picking personnel, minimizing error rates, enhancing order processing efficiency, and decreasing the need for operational space while significantly improving space utilization efficiency. The embodiments of the present disclosure are further described in detail below with reference to the accompanying drawings.

Embodiment 1

This embodiment provides a "live-streaming" warehouse management system based on UHF RFID technology, wherein the system comprises a data processing center 30, an RFID-based automated sorting vehicle 1, an RFID gateway 2 and an automatic sorting line 3; wherein the RFID-based automated sorting vehicle 1 is equipped with a picking processor 11, the RFID gateway 2 is equipped with a first verification processor 201, the RFID gateway 2 is arranged at a cargo box input port of the automatic sorting line 3, and the automatic sorting line 3 is further equipped with a DWS (Dimension, Weight, Scanning) device 4, the DWS device 4 is equipped with a second verification processor 401, and the DWS device 4 is positioned before each sorting outlet of the automatic sorting line 3;

The picking processor 11 is connected to the data processing center 30 by means of a wireless network, the first verification processor 201 and the second verification processor 401 are connected to the data processing center 30 by means of a wireless network or a wired network, and uploading and downloading of data are realized by means of a network, so that the data processing center 30 completes processing and tracking of corresponding orders according to information fed back by the picking processor 11, the first verification processor 201 and the second verification processor 401.

The system further comprises a replenishment processor 20, and the replenishment processor 20 is connected to the data processing center 30 via a wired or wireless network.

The RFID gateway 2 is further equipped with a box code scanning device 21 and an RFID reader-writer 22, and the box code scanning device 21 and the RFID reader-writer 22 are connected to the first verification processor 201 via the wireless network or the wired network. The picking processor 11 completes a first verification of each order during a picking process, the first verification processor 201 completes a second verification of each order, and the second verification processor 401 completes a third verification of each order.

In the present disclosure, the data processing center 30 can obtain order data and warehousing data through the existing WMS system. As shown in FIG. 1, the verification processor in FIG. 1 includes a first verification processor 201 and a second verification processor 401.

Embodiment 2

This embodiment provides a "live-streaming" warehouse management system based on UHF RFID technology, wherein the system comprises a data processing center 30, an RFID-based automated sorting vehicle 1, an RFID gateway 2 and an automatic sorting line 3; wherein the RFID-based automated sorting vehicle 1 is equipped with a picking processor 11, the RFID gateway 2 is equipped with a first verification processor 201, the RFID gateway 2 is arranged at a cargo box input port of the automatic sorting line 3, and the automatic sorting line 3 is further equipped with a DWS device 4, and the DWS device 4 is positioned before each sorting outlet and equipped with a second verification processor 401.

The picking processor 11 is connected to the data processing center 30 by means of a wireless network, the first verification processor 201 and the second verification processor 401 are connected to the data processing center 30 by means of a wireless network or a wired network, and uploading and downloading of data are realized by means of a network, so that the data processing center 30 completes processing and tracking of corresponding orders according to information fed back by the picking processor 11, the first verification processor 201, the weight and the second verification processor 401.

Figure 2:
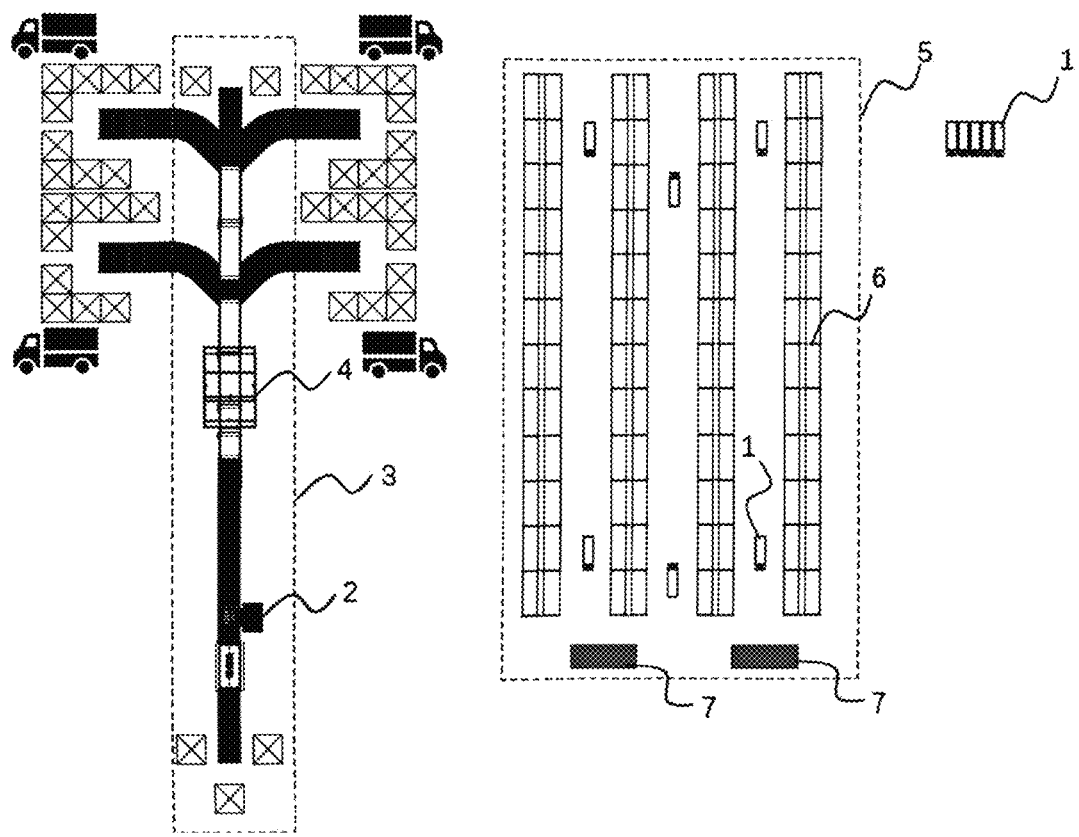
FIG. 2 is a structural diagram of the "live-streaming" warehouse management system based on UHF RFID technology provided by the present disclosure.

As shown in FIG. 2, the "live-streaming" warehouse management system based on UHF RFID technology provided in the present disclosure requires only the setup of a warehouse 5 and an automatic sorting line 3 as the operational site. The warehouse is equipped with rows of shelves 6, and both ends of the shelves 6 can be equipped with accumulation areas 7 according to actual needs. The accumulation areas 7 are used for the temporary storage of packed cargo boxes or empty boxes, which can be placed on corresponding pallets to facilitate transportation. The RFID-based automated sorting vehicles 1 travel through the shelf aisles to simultaneously perform packing processes such as order picking, first verification, sealing boxes, printing box codes, and attaching them. The box codes contain item information and corresponding order information within each cargo box. After packing, the picking personnel place the packed cargo boxes directly in the accumulation area 7, where specialized transport personnel responsible for transporting the cargo boxes will move them to the cargo box input port of the automatic sorting line 3 (in practical applications, an automatic conveyor line can also be considered; picking personnel place the packed cargo boxes directly onto the automatic conveyor line, and the automatic conveyor line transports the cargo boxes to the cargo box input port of the automatic sorting line 3). The cargo boxes enter the automatic sorting line 3 through the RFID gateway 2. When the cargo boxes pass through the RFID gateway 2, the box code scanning device 21 reads the box codes attached to the cargo boxes to obtain the item information in the cargo boxes, while the RFID reader-writer 22 reads the item information from the cargo boxes. The first verification processor 201 compares the two sets of information to complete the second verification. If there is a discrepancy, the cargo box is directed to a rejection outlet for manual processing before being reintroduced to the cargo box input port of the automatic sorting line 3. If the verification is correct, the cargo box proceeds onto the automatic sorting line 3, where the automatic sorting line 3 is equipped with a plurality of sorting outlets. Before reaching each sorting outlet, the cargo boxes pass through a DWS device 4, where the second verification processor 401 calculates the theoretical weight/volume of the cargo box based on the item information obtained from scanning the box code information. This is then compared with the actual measured weight/volume to complete the third verification. This third verification not only verifies the correctness of the items inside the cargo box but also checks for the use of inappropriate cargo boxes by the picking personnel. For example, if an order contains only 12 items and an A-sized cargo box would suffice, but the picking personnel use a larger C-sized cargo box, the second verification processor 401 can detect this issue through the volume comparison, allowing for subsequent reminders to the picking personnel to select more suitable cargo boxes. Once the third verification is passed, the cargo boxes are directed to the corresponding sorting outlets based on the order's destination and are loaded onto vehicles for dispatch.

As mentioned above, compared to the existing warehouse management system based on the "pick-and-sort" picking model, the "live-streaming" warehouse management system based on UHF RFID technology provided in the present disclosure saves space required for sorting, packing, and verification areas, streamlining the picking process. Furthermore, the RFID-based automated sorting vehicle 1 in the "live-streaming" warehouse management system based on UHF RFID technology provided in the present disclosure employs a novel picking model—the "live-streaming" picking model, which directly "seeds" a plurality of orders while picking. To implement this picking model and maximize picking efficiency, the "live-streaming" warehouse management system based on UHF RFID technology provided in the present disclosure operates as follows:

First, Data Processing Center 30:

Upon receiving orders, the data processing center 30 merges the received orders based on a preset order merging strategy, generating order fulfillment tasks and corresponding order fulfillment plans. Subsequently, each RFID-based automated sorting vehicle 1 retrieves order fulfillment tasks and corresponding order fulfillment plans from the data processing center 30 via the configured picking processor.

Each order fulfillment task comprises N orders, where 1≤N≤S, with S determined by the number of the cargo box placement positions 18 equipped on the RFID-based automated sorting vehicle 1. The corresponding order fulfillment plan includes the specifications and quantities of cargo boxes required for each order in the order fulfillment task, and corresponding order fulfillment path.

Taking into account both picking efficiency and subsequent loading and dispatch efficiency, the present disclosure proposes a multi-dimensional order merging strategy. Specifically, the merging process considers the following dimensions: 1) the requested delivery time of the orders; 2) the order destination; 3) the overlap of picking locations for the items within the order; 4) the order size; 5) the items within the order; 6) weather conditions; and 7) the status of transport vehicles and road condition information.

Figure 3:
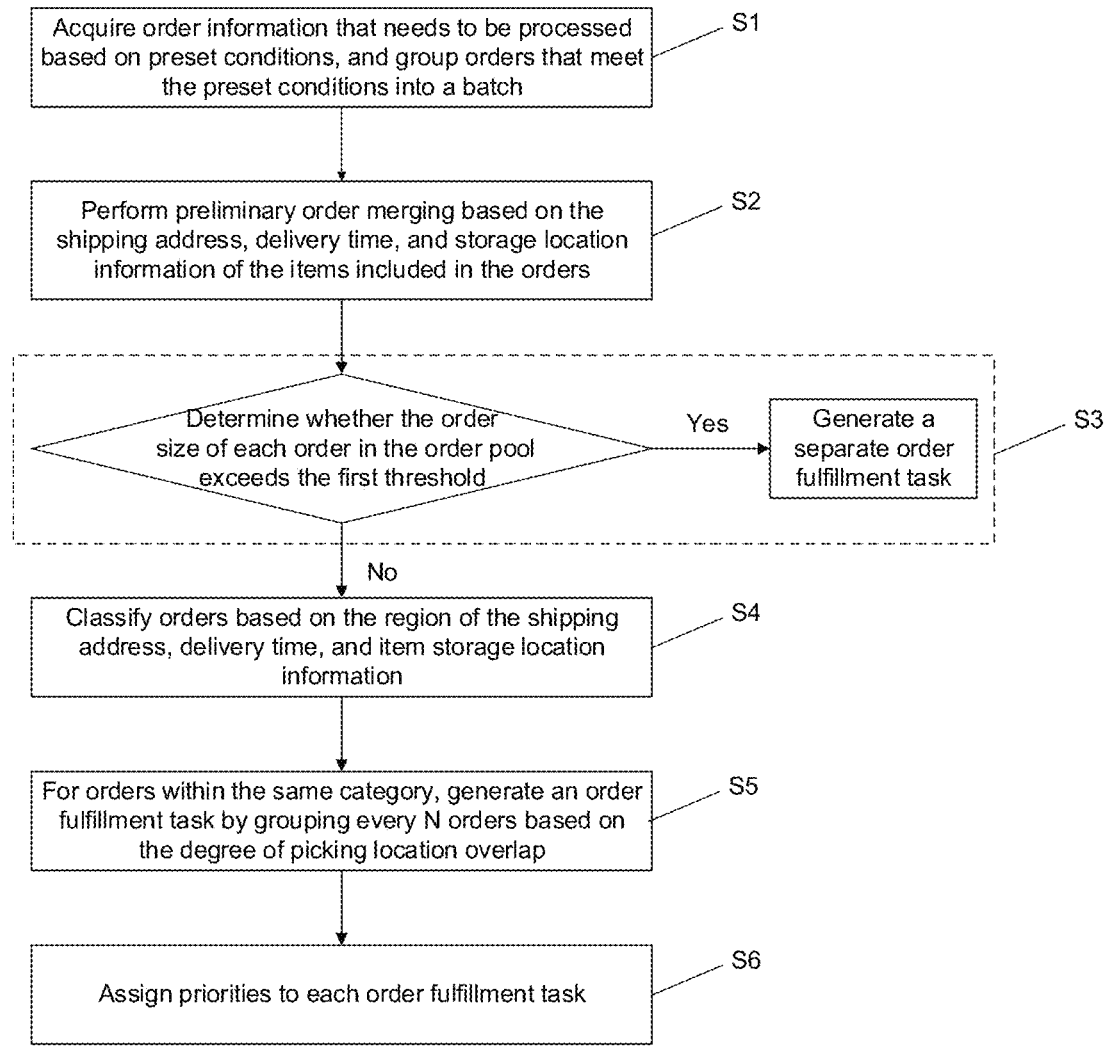
FIG. 3 is a flowchart of the multi-dimensional order merging strategy provided by the present disclosure.

As shown in FIG. 3, this embodiment takes a warehousing center as an example. This warehousing center receives orders from stores located in various cities across the country. A specific order merging strategy employed is as follows:

Step S1: Acquire order information that needs to be processed based on preset conditions, and group orders that meet the preset conditions into a batch. The preset conditions include time, region, items, and others.

For instance, all orders received within a predetermined time frame can be grouped into a batch based on their receipt time. Alternatively, orders with delivery addresses in the same region can be grouped into a batch. Another option is to group orders containing specific items into a batch. Depending on the actual application scenario, other preset conditions may also be applied.

In practical applications, selected orders can be grouped into a batch based on specific circumstances.

For example, if the weather forecast indicates that there will be heavy rain in Wuhan in three days, the data processing center 30 can screen out all orders with Wuhan as the destination before order merging and prioritize their processing. Similarly, if the transportation department notifies the warehousing center that a certain highway section to Guangzhou will be closed for maintenance in three days, the data processing center 30 can also screen out all orders with Guangzhou as the destination and prioritize their processing.

Another example is when there is a sudden drop in temperature nationwide, and orders containing specific items such as down jackets need to be prioritized. In this case, the data processing center 30 can screen out orders containing down jackets as a batch and prioritize their processing.

Order information includes delivery time, item type, size and corresponding quantity, and shipping information (including recipient, contact phone number, and shipping address).

Step S2: Perform preliminary order merging based on the shipping address, delivery time, and storage location information of the items included in the orders. The storage location information of the items is pre-stored in the data processing center 30.

In practical applications, considering the situation where the same store places a plurality of scattered orders within a short period of time, orders that meet the following three conditions simultaneously can be preliminarily merged:

Condition 1: The delivery time falls within the same time period, such as the same day.

Condition 2: The shipping address is the same store.

Condition 3: The items included are stored in the same area.

After preliminary merging, a plurality of scattered orders placed by the same store within a short period of time, where the items to be picked are located in the same area, can be combined into a single order.

In practical applications, after screening out orders that meet the aforementioned three conditions, the order size can also be used as a secondary pre-screening criterion. For orders with an order size exceeding a preset second threshold, preliminary merging is not applied. This second threshold is a manually set value, taking into account that even among a plurality of scattered orders placed by the same store within a short period of time, there may be larger orders. Therefore, the second threshold can be set based on experience, and orders exceeding this threshold are not subject to preliminary merging.

After executing the above steps, the preliminarily merged orders are treated as a single order and placed into the order pool together with other orders that have not been preliminarily merged, for the subsequent steps to be executed.

Step S3: Determine whether the order size of each order in the order pool exceeds the first threshold. If it does, generate a separate order fulfillment task for that order. If it does not, proceed to Step S4. The first threshold is determined based on the maximum order size that the RFID-based automated sorting vehicle can handle. The first threshold is greater than the second threshold.

In this step, the first threshold is set based on the maximum order size that the RFID-based automated sorting vehicle can accommodate. For example, the first threshold can be set at 800 items, while the second threshold can be set at 300 items.

Step S4: Classify orders with an order size not exceeding the first threshold based on the region of the shipping address, delivery time, and item storage location information. The region of the shipping address refers to administrative regions or regions divided according to the sales models of retail formats.

For example, administrative regions include the same city, the same province, or other administratively defined regions such as the Eastern China region, Northern China region, etc. Regions divided according to the sales models of retail formats refer to those divided by enterprises based on their own distribution models. For instance, if there are two distributors in a city, then that city is divided into two distribution regions.

For instance, orders that simultaneously meet the following three conditions are classified into one category:
  Condition 1: The shipping address belongs to the same province.
  Condition 2: The delivery time falls within the same time period, such as the same day.
  Condition 3: The items included are stored in the same area.

Step S5: For orders within the same category, generate an order fulfillment task by grouping every N orders based on the degree of picking location overlap.

Define the picking location as the aisle where the item storage location is situated, or as the specific position within the aisle corresponding to the item storage location.

When the picking location is defined as the aisle where the item storage location is situated, all items located on both sides of the shelves within the same aisle have the same picking location.

When the picking location is defined as the specific position within the aisle corresponding to the item storage location, items stored in opposite positions on both sides of the shelves within the same aisle have the same picking location.

In practical applications, priority is given to fulfilling orders with larger order sizes. The specific method for generating an order fulfillment task can be Method One or Method Two.

Method One: Select the order with the largest order size within the same category. Calculate the picking location overlap between this largest order and the remaining orders. Group the N-1 orders with the highest picking location overlap with the largest order to form an order fulfillment task together with the largest order. Then, select the largest order among the remaining orders and repeat the process of calculating the picking location overlap with the other orders. Continue this step iteratively until all orders have been combined into order fulfillment tasks. The picking location overlap refers to the proportion of items in the largest order that have the same picking location as those in any other order, relative to the total number of items in the largest order.

Method Two: Select the order with the largest order size within the same category. Sequentially calculate the picking location overlap between this largest order and the remaining orders. Merge the order with the highest picking location overlap with the largest order into a virtual order. Then, calculate the picking location overlap between this virtual order and the remaining orders. Merge the order with the highest picking location overlap with the virtual order into an even larger virtual order. Repeat this step cyclically until N orders are merged into one virtual order. Generate an order fulfillment task for all the orders within this virtual order. Then, select the largest order among the remaining orders and repeat the process iteratively until all orders have been combined into order fulfillment tasks.

Step S6: Assign priorities to each order fulfillment task.

In practical application, the priority of an order fulfillment task can be set based on the total quantity of items it contains, or it can be determined by factors such as delivery time, shipping address (and its affiliation), or other criteria.

For example, calculate the total quantity of items included in each order fulfillment task and prioritize the tasks with larger quantities for processing.

For example, based on the delivery time considered in Step S4, prioritize the order fulfillment tasks with earlier delivery times for processing.

Another example is to customize the priorities for different provinces, cities, or regions based on the shipping address considered in Step S4.

Additionally, consider the inventory levels of various items in the warehousing center and prioritize the order fulfillment tasks that involve items with higher inventory levels for processing.

The subsequent order fulfillment process can distribute tasks to RFID-based automated sorting vehicles for allocation based on the set priorities.

In the above steps, some may require adaptive adjustments based on actual situations. For instance, if the preset condition in Step S1 is region, i.e., orders belonging to the same region are grouped into a batch for processing, then when Step S4 classifies orders with order sizes below the first threshold based on the shipping address region, delivery time, and storage location information of the items included in the orders, the consideration of the shipping address region can be at a lower level of affiliation. For example, if Step S1 groups orders belonging to the same province into a batch, then when Step S4 classifies orders based on the shipping address region, it can classify them by city or other regional levels.

Second, RFID-Based Automated Sorting Vehicle:

Each RFID-based automated sorting vehicle 1 retrieves order fulfillment tasks and corresponding order fulfillment plans from the data processing center 30 via the configured picking processor.

The data processing center 30 consolidates orders to generate a plurality of order fulfillment tasks, each containing N orders. Each RFID-based automated sorting vehicle 1 retrieves order fulfillment tasks and corresponding order fulfillment plans from the data processing center 30 via the configured picking processor. The picking processor generates corresponding order fulfillment instructions based on the order fulfillment plan, enabling picking personnel to complete the order fulfillment task according to the order fulfillment instructions.

Figure 4:
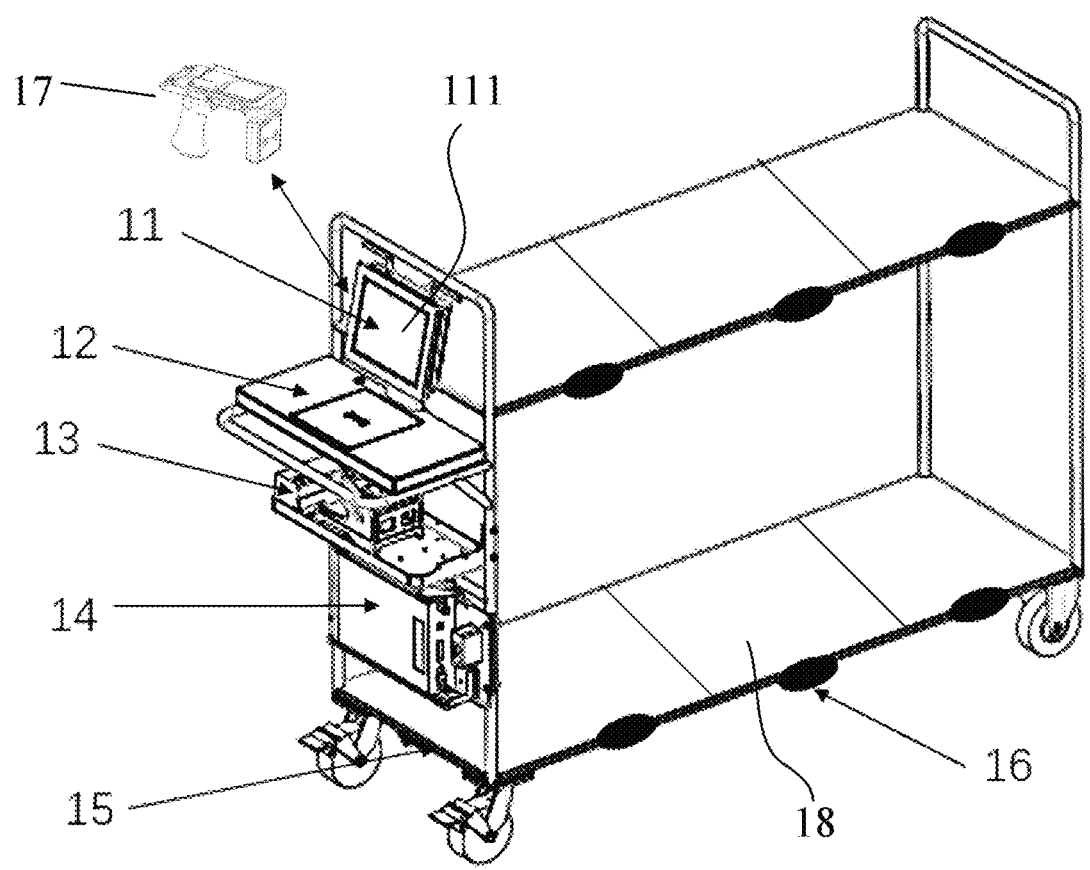
FIG. 4 is a structural diagram of the RFID-based automated sorting vehicle in the "live-streaming" warehouse management system based on UHF RFID technology provided by the present disclosure.

The structure of the RFID-based automated sorting vehicle 1 is shown in FIG. 4. To ensure a 100% picking accuracy rate for the "live streaming" picking mode and significantly improve picking efficiency, the RFID-based automated sorting vehicle 1 provided in the present disclosure is equipped with a picking processor 11, an RFID reader and a corresponding RFID scanning area 12 (the RFID reader is not shown in FIG. 4), a printer 13, an indicator 16, and headphones (considering that the headphones can be set as Bluetooth wireless headphones, they are not shown in FIG. 4). The picking processor 11 is equipped with a display screen, which can be an interactive display screen 111 (for practical applications, an input keyboard can also be configured). By improving the RFID antenna to control the reading distance of the RFID reader, it is possible to read only the items placed in the RFID scanning area 12 without mistakenly reading the items on the shelves, and a plurality of items can be scanned simultaneously. The RFID reader 17 and the printer 13 can be connected to the picking processor 11 via a wireless network or a data transmission line. The headphones can be connected to the picking processor 11 via Bluetooth or a data transmission line. The indicator 16 is electrically connected to the picking processor 11. The RFID-based automated sorting vehicle 1 is also equipped with a voice interaction system 112, allowing picking personnel to have simple voice interactions with the picking processor 11 through Bluetooth headphones.

In practical applications, the picking processor 11 can be a mobile handheld device, such as a tablet computer, which adopts an integrated device with a processor and display screen; alternatively, the picking processor 11 can be a fixed computer installed on an RFID-based automated sorting vehicle, equipped with an input keyboard and a display according to actual needs. The display screen can be a mobile interactive display screen.

The RFID-based automated sorting vehicle 1 further includes a vehicle frame body 15, and the vehicle frame body 15 is set as a single-layer or multi-layer structure based on actual application scenario requirements. In FIG. 4, the vehicle frame body 15 is illustrated with a two-layer structure as an example, equipped with S cargo box placement positions 18. An indicator 16 is set at each cargo box placement location 18. The indicator 16 can be either an indicator light or an electronic display board to assist with the order fulfillment instructions issued by the picking processor 11 by indicating the corresponding commodity storage location to the picking personnel. The RFID-based automated sorting vehicle 1 is also equipped with a replaceable rechargeable battery 14.

In practical applications, after picking personnel receive the RFID-based automated sorting vehicle 1, they input their employee ID and then click "Start Picking" on the interactive display screen 111. Upon receiving this click information, the data processing center 30 sends the order fulfillment task with the highest current priority to the RFID picking trolley. At the same time, the data processing center 30 updates the status of the N orders contained in this order fulfillment task to "Picking in Progress" and associates them with the RFID-based automated sorting vehicle ID and picking personnel ID.

After receiving the order fulfillment task, the picking processor 11 generates corresponding order fulfillment instructions based on the associated order fulfillment plan and prompts the picking personnel to perform the corresponding operations through the interactive display screen 111 and headphones. The corresponding order fulfillment plan includes the specifications and quantities of the cargo boxes required for each order in the order fulfillment task, and the corresponding order fulfillment path (since the data processing center 30 has already considered the optimal order fulfillment path when generating the order fulfillment task, the order fulfillment path for the task is also determined at that time).

The RFID-based automated sorting vehicle 1 shown in FIG. 4 is illustrated with S=6 cargo box placement positions 18 as an example. Therefore, let's assume that an RFID-based automated sorting vehicle 1 has received an order fulfillment task containing six orders, referred to as Order 1 through Order 6. At this point, the interactive display screen 111 displays the specifications and quantities of the cargo boxes required for each of the six orders.

When order fulfillment begins, the order fulfillment instructions prompt the picking personnel to retrieve cargo boxes of the corresponding specifications for Order 1 through Order 6 and place them in the corresponding cargo box placement positions 18. For example, if the order fulfillment instruction is "Please place an A-sized cargo box in the first position on the upper level," the indicator light at the first position on the upper level of the RFID-based automated sorting vehicle will illuminate to indicate to the picking personnel to place the A-sized cargo box there.

During the order fulfillment process, the picking processor 11 issues an order fulfillment instruction based on the order fulfillment path, prompting the picking personnel, "Please proceed to the Pth storage location on the first row of shelves." Upon arriving at the designated storage location, the picking personnel respond, "Arrived," through the voice interaction system 112. At this point, the picking processor 11 issues the order fulfillment instruction, "Please pick 3 units of item B." The picking personnel then retrieve 3 units of item B from the storage location and place them in the RFID scanning area 12. The RFID reader 17 scans the item information and displays the result on the screen, while also playing the corresponding voice instruction. If the item information is incorrect, it will specify the error-whether it's a shortage, excess, or wrong item. For example, if the picking personnel only picked 2 units, after the RFID reader scans the item information, the picking processor 11, upon verification, issues the instruction, "You have picked 2 units of item B, please pick 1 more unit." If the item information is correct, it issues the order fulfillment instruction, "Please place the 3 units of item B in the first position on the upper level." Simultaneously, the indicator light at the first position on the upper level of the RFID-based automated sorting vehicle 1 illuminates. If the picking personnel do not place the items in the corresponding position, the RFID-based automated sorting vehicle will also issue a prompt. This function can be implemented using weight detection or AI image recognition. If weight detection is used, a weighing device can be installed beneath the S cargo box placement positions 18. The picking processor determines whether the corresponding weight has been added to the position based on weight change information. For example, if the weighing device installed beneath the first position on the upper level does not detect an increase in weight, the picking processor 11, upon comparison, issues the instruction, "Placement error in position." If AI image recognition is used, the RFID-based automated sorting vehicle needs to be equipped with cameras. The cameras can be installed above the RFID-based automated sorting vehicle in a location where they can simultaneously capture images of all S cargo box placement positions 18, based on the actual scene. The AI image recognition results are used to determine whether the placement is correct.

In the order fulfillment process, the picking processor achieves first verification through the RFID reader 17, order fulfillment instructions, indicators, and either weight detection or AI image recognition, thereby maximizing the accuracy of order fulfillment. Additionally, an interactive display screen 111 is set up to provide real-time updates on the fulfillment progress, accompanied by corresponding voice instructions. This allows picking personnel to continue with the fulfillment process upon their return, even if they need to step away due to other tasks or emergencies during the order fulfillment process. Furthermore, the picking processor uploads the fulfillment progress to the data processing center 30 in real time. In the event that picking personnel are unavailable, there is a malfunction with the vehicle, or any other unexpected situation arises, the data processing center 30 can transfer the order fulfillment task to another picking personnel or another RFID-based automated sorting vehicle to continue the fulfillment process.

When the picking processor 11 detects that a cargo box at a certain location is full (based on the cargo box specifications and the information of the items already placed), it prompts the picking personnel with the message, "Cargo box is full. Do you need to print a box code?" The picking personnel can choose to "Print a box code" by clicking on the interactive screen or through the voice interaction system 112. Upon this choice, the picking processor 11 sends a command to the printer 13 to print the box code, which includes all the item information within the cargo box and the corresponding order information. Additionally, the box code indicates the sequence number of this cargo box for the corresponding order.

After the box code is printed, the picking processor 11 prompts the picking personnel to affix the box code to the corresponding cargo box (as indicated by the indicator 16), pack and seal the cargo box, and then place the cargo box in the nearest collection area 7. The accumulation area 7 also holds empty cargo boxes, allowing the picking personnel to retrieve an empty one to continue with the order fulfillment process after placing the sealed box there. Upon completion of the box code printing, the picking processor 11 sends the box code information to the data processing center 30, enabling the data processing center 30 to associate the box code with the corresponding order.

When the picking processor 11 detects that all items for a particular order (let's assume it's Order One) have been retrieved, regardless of whether the last cargo box is full or not (the order fulfillment plan typically specifies appropriately sized cargo boxes based on the order size, but sometimes they may not be exactly full), it prompts the picking personnel with the message, "Order One has been fully fulfilled, please print the box code." The picking personnel then print the box code as instructed and affix it to the corresponding cargo box, seal the box, and place it in the nearest accumulation area 7. Upon receiving the last box code information for a particular order, the data processing center 30 updates the order status to "Fulfillment Completed."

When the picking personnel arrive at the final picking location for the current order fulfillment task and complete the fulfillment for that location, the picking processor 11 checks if any orders are in a stockout status. If there are no orders in stockout, the picking processor 11 resets to its initial state and remains idle until the picking personnel click "Start Fulfillment" on the interactive display screen 111 to initiate a new order fulfillment task.

During the order fulfillment process, if the picking personnel discover a shortage of items required for a particular order, they use the picking processor 11 to send a "restocking request" to the data processing center 30. This restocking request includes the quantity of items out of stock and the corresponding order information for the shortage. The data processing center 30 then uses the replenishment processor 20 to notify warehouse personnel to restock in a timely manner. After restocking, the warehouse personnel send a restocking completion message to the data processing center 30 via the replenishment processor 20. Upon receiving this message, the data processing center 30 updates the status of the aforementioned "restocking request" to "completed." The replenishment processor 20 can be a handheld scanning terminal or another device.

After the picking processor 11 sends out a restocking request, it continues to prompt the picking personnel to retrieve the remaining items included in the order. Upon completing all order fulfillment tasks for the current batch of orders, the picking personnel can click "Fulfillment Completed" on the interactive screen. Upon receiving this click information, the picking processor 11 checks if any orders are in a backorder status. If there are, it reads the status of the "restocking request" sent out from the data processing center 30. If the status is "completed," the picking processor 11 prompts the picking personnel to proceed to the corresponding storage location to fulfill the backordered items, followed by printing the box code, sealing the box, and placing it in the nearest accumulation area 7. If the status of the "restocking request" is "pending," the picking processor 11 records the backorder information and prompts the picking personnel to place the cargo box in a designated area (a backorder zone can be set up near the accumulation area 7 to hold cargo boxes that are incomplete due to backorders) for subsequent handling by the restocking personnel. At the same time, it uploads the backorder information to the data processing center 30, which updates the order information corresponding to the backorder to a backorder status.

In practical application, the data processing center 30 regularly reconciles the quantity information of all items on the current shelves. When the quantity of a particular item falls below the minimum inventory level, it also prompts the warehouse personnel to restock in a timely manner.

In addition to completing the aforementioned order fulfillment tasks, the picking processor 11 also monitors the battery level, printer paper status, and indicator light functionality in real-time. In case of any abnormalities, the corresponding error messages will be displayed on the interactive display screen 111.

Third, RFID Gateway:

After the picking personnel place the sealed boxes in the accumulation area 7, specialized transportation personnel responsible for transporting the boxes will move them to the cargo box input port of the automatic sorting line 3. As shown in FIG. 1, the automatic sorting line 3 can be equipped with a plurality of cargo box input ports, each of the cargo box input ports is equipped with an RFID gateway 2. The RFID gateway 2 is configured with a first verification processor 201. When a box passes through the RFID gateway 2 and enters the automatic sorting line 3, the first verification processor 201 retrieves the item information inside the box by reading the box code information on the box using the box code scanning device 21. It also obtains item information by reading the RFID tags of the items inside the box using the RFID reader 17. The first verification processor 201 then compares the two sets of information to complete the second verification. If any discrepancies are found, the box is directed to a discrepancy outlet and an alarm is triggered.

Fourth, DWS Device:

The sealed boxes are transported on the automatic sorting line 3 and pass through the DWS device 4 before reaching the various sorting outlets. The DWS device 4 measures the weight and/or volume of the boxes and simultaneously scans the box code information. It calculates the theoretical weight and/or volume of the corresponding box based on the box code information and compares it with the measured weight and/or volume of the box to complete the third verification. If there are any discrepancies, the box is directed to a discrepancy outlet and the corresponding discrepancy information is prompted.

Additionally, by comparing the measured weight and volume, it is possible to check whether the prescribed box type is strictly used. If a volume measurement device is to be used, a volume measuring instrument can be employed or the volume can be calculated directly based on the specification information in the box code. However, considering the possibility of partially filled boxes, some errors may occur.

After passing through the DWS device 4, the boxes are directed to their respective sorting outlets based on their destination for shipment and loading onto vehicles.

Fifth, Automatic Sorting Line:

The automatic sorting line is equipped with a plurality of sorting outlets, which are configured based on the shipping addresses of all orders in the order pool. For example, if it is determined through statistics that the orders for morning dispatch mainly include items destined for five cities: Shanghai, Beijing, Guangzhou, Wuhan, and Shenzhen, the sorting outlets of the automatic sorting line can be set accordingly. Additionally, the data processing center 30 can also calculate the volume of items destined for each of the five cities and adjust the positional order of the sorting outlets based on the volume of items for each city. Taking into account the mechanical wear and service life of the automatic sorting line, the sorting outlet closest to the start of the line is assigned to the city with the largest volume of items.

Some steps in the embodiments of the present disclosure can be implemented using software, and the corresponding software programs can be stored in readable storage media such as optical discs or hard disks.

The above are only preferred embodiments of the present disclosure and are not intended to limit the present disclosure. Any modifications, equivalent substitutions, improvements, etc. made within the spirit and principles of the present disclosure shall be included in the protection scope of the present disclosure.

What is claimed is:

1. A "live-streaming" warehouse management system based on Ultra-High Frequency (UHF) RFID technology, wherein the system comprises:
   a data processing center, an RFID-based automated sorting vehicle, an RFID gateway and an automatic sorting line;
   wherein the RFID-based automated sorting vehicle is equipped with a picking processor, the RFID gateway is equipped with a first verification processor, the RFID gateway is arranged at a cargo box input port of the automatic sorting line, and the automatic sorting line is further equipped with a DWS (Dimension, Weight, Scanning) device, and the DWS device is positioned before each sorting outlet of the automatic sorting line and equipped with a second verification processor;
   wherein the picking processor is connected to the data processing center by means of a wireless network, the first verification processor and the second verification processor are connected to the data processing center by means of the wireless network or a wired network, and uploading and downloading of data are realized by means of the wireless network or the wired network, so that the data processing center completes processing and tracking of corresponding orders according to information fed back by the picking processor, the first verification processor and the second verification processor;
   wherein the system further comprises the steps of:
   completing, by the picking processor, a first verification of each order during a picking process, completing, by the first verification processor, a second verification of each order, and completing, by the second verification processor, a third verification of each order;
   wherein the RFID-based automated sorting vehicle is further equipped with an RFID reader, a corresponding RFID scanning area and a printer; and
   wherein the RFID reader is used to read a RFID tag information of items placed within the corresponding RFID scanning area;
   wherein the RFID reader and the printer are connected to the picking processor via the wireless network or a data transmission line; and
   the RFID-based automated sorting vehicle is equipped with one or more cargo box placement positions;
   the data processing center merges the one or more orders into an order fulfillment task and a corresponding order fulfillment plan based on a preset multi-dimensional order merging strategy;
   retrieving, by the picking processor, the order fulfillment task from the data processing center and generating corresponding order fulfillment instructions based on the order fulfillment plan, allowing picking personnel to complete the order fulfillment task according to order fulfillment instructions; and
   wherein the order fulfillment plan includes specifications and quantities of cargo boxes required for each order in the order fulfillment task, and corresponding order fulfillment path;
   wherein during an order fulfillment process, the picking processor simultaneously performs order fulfillment and the first verification for the one or more orders using components of the RFID-based automated sorting vehicle, and then completes a packing process, where the packing process includes sealing a cargo box, printing a box code and affixing the box code to the cargo box;
   wherein, a number of the one or more cargo box placement positions is greater than a number of the one or more orders;
   wherein the box code contains item information and corresponding order information within the cargo box, and the box code is marked with a sequence number of the cargo box for the corresponding order;
   wherein the RFID gateway is further equipped with a box code scanning device and an RFID reader-writer, and the box code scanning device and the RFID reader-writer are connected to the first verification processor via the wireless network or the wired network;
   reading, by the box code scanning device, box code information in response to the cargo box passing through the RFID gateway and retrieving item information comprising information regarding items inside the cargo box based on the box code information;

directly reading, by the RFID reader-writer, RFID tags of the items inside the cargo box in response to the cargo box passing through the RFID gateway to obtain the information regarding items inside the cargo box; and comparing, by the first verification processor, the information regarding items inside the cargo box read through the box code scanning device with the information regarding items inside the cargo box read by the RFID reader-writer to complete the second verification of the one or more orders;

measuring, by the DWS device, a weight and/or a volume of the cargo box and scanning the box code information before the cargo box reaches a corresponding sorting outlet; and calculating, by the second verification processor, a theoretical weight and/or a theoretical volume of the cargo box based on the box code information and comparing the theoretical weight and/or volume of the corresponding cargo box with the measured weight and/or the measured volume of the cargo box to complete the third verification of the order; and wherein the preset multi-dimensional order merging strategy comprises the following dimensions: order arrival time, order destination, items within the order, overlap of picking locations for the items within the order, order size and weather and road conditions at the order destination; and a specific order merging process is determined by the combination and sequence of the dimensions.

2. The system according to claim 1, wherein the picking processor is further equipped with an interactive display screen and a voice interaction system, allowing the picking personnel to interact with the picking processor through the interactive display screen and the voice interaction system.

3. The system according to claim 1, wherein the system further comprises a replenishment processor, and the replenishment processor is connected to the data processing center via the wired network or the wireless network.

4. The system according to claim 1, wherein each cargo box placement position on the RFID-based automated sorting vehicle is further equipped with an indicator, and the indicator is electrically connected to the picking processor to assist with the order fulfillment instructions by indicating a corresponding cargo box placement location of the one or more cargo box placement positions to the picking personnel.

5. The system according to claim 1, wherein sorting outlets of the automatic sorting line are arranged based on delivery addresses of all orders in an order pool; and a position sequence of the sorting outlets of the automatic sorting line is arranged based on a total number of all orders passing through each sorting outlet in the order pool.

6. The system according to claim 1, wherein the RFID-based automated sorting vehicle is equipped with a driving device and a robotic arm device, and all tasks performed by the picking personnel are completed through the cooperation of the driving device and the robotic arm device.

* * * * *